Patented Mar. 30, 1926.

1,578,588

UNITED STATES PATENT OFFICE.

HENRY DREYFUS, OF LONDON, ENGLAND.

MANUFACTURE OF VISCOSE.

No Drawing.  Application filed January 28, 1922. Serial No. 532,505.

*To all whom it may concern:*

Be it known that I, HENRY DREYFUS, a citizen of the Swiss Republic, of London, England, have invented certain new and useful Improvements in or Relating to the Manufacture of Viscose, of which the following is a specification.

In the manufacture of viscose according to the usual methods, cellulose or a near conversion product thereof, such as hydrocellulose, oxycellulose or sulphite cellulose (all hereinafter included in the term cellulosic body) is treated with an alkaline solution, usually caustic soda and afterwards with carbon disulphide, the alkali being usually employed in a proportion of about 2 molecules (about 40 parts by weight of caustic soda), per molecule of cellulose, taken as $C_6H_{10}O_5$, (i. e. per 162 parts by weight of cellulose) and the carbon disulphide in a proportion of about one molecule (i. e. 76 parts by weight) per molecule (per 162 parts) of cellulose. An excess of carbon disulphide is generally employed with a view to ensuring attack and combination with the whole mass of alkali-cellulose.

With the usual process, the resulting cellulose xanthogenate must be subjected to prolonged "ripening" before it can be used for the chief industrial applications, such as the manufacture of artificial silk, films, plastic masses and so forth.

In the ripening process some of the combined carbon disulphide is split off, so that while originally one molecule of carbon disulphide may have been fixed on one molecule of cellulose, a considerable portion of this disulphide is split off again during the ripening. Moreover the cellulose aggregate is detrimentally affected especially during the ripening process, by the degrading action of free or excess alkali which is present during the prolonged ripening, and of the oxidation of the cellulose by reason of the prolonged standing in presence of caustic alkali, the cellulose compound being in solution so that the cellulose aggregate is very easily attacked. It has even been proposed for quickening the process to introduce oxidizing agents such as peroxides, permanganates and the like.

The present invention aims to avoid this usual ripening in the manufacture of viscose, and to provide a process which will allow of making directly a high molecular viscose wherein a molecule of carbon disulphide is combined with several molecules of cellulose directly, i. e. in the xanthogenating reaction itself, while substantially retaining the high molecular nature of the cellulose molecule or aggregate of the starting product and avoiding the detrimental effects which are produced on the cellulose molecule by ordinary ripening, oxidation of the molecule of cellulose, especially in solution, and the degrading action which is exerted by prolonged standing with alkali, even in dilute form being avoided. It is therefore intended in the present invention to do just the contrary to what is the usual practice. The high molecular cellulose xanthogenates which are thus obtainable will give viscous solutions capable of being manufactured into much stronger artificial silk, films and other products for which viscose is applicable. They can also be spun as much stronger solutions than usual.

In explanation of the above statement regarding producing a high molecular viscose wherein a molecule of carbon disulphide is combined with several molecules of cellulose directly in the xanthogenating reaction, without ripening, it may be stated as follows:

The original equation

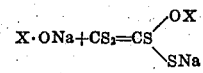

which has been given in literature to represent a xanthogenating reaction is not to be taken as a literal and definite indication. The X in the xanthogenate formula

in this equation is an indefinite expression intended to represent a cellulose residue of various dimensions, and as a matter of fact the formula itself is only a rough representation of a percentage composition of the xanthogenate, in which the cellulose residue is left quite indefinite. The subject is a difficult one and is still not entirely cleared up, but according to the results of investigation it is believed that the usual viscose, prior to ripening, is a compound corresponding to the percentage formula

and composed of four xanthogenate molecules.

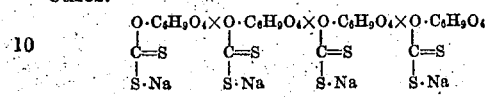

bound in some hitherto not clearly known way and from which the carbon disulphide (or dithiocarbonate) residuals are successively split off in the progress of ripening, so that in the progress of the ripening ultimately a viscose remains in which only one carbon disulphide residue is left attached to a chain of cellulose residues. (See Emil Heuser, Lehrbuch der Cellulosechemie, Berlin, 1923, pages 68–69.)

In the ripening of viscose, the cellulose aggregate of the complex molecule undergoes degradation and oxidation and it is the object of the present invention to avoid these detrimental effects by producing a high molecular viscose in which one carbon disulphide molecule is attached right away to the cellulose aggregate or complex without going through the detrimental process of ripening, thereby preserving the high molecular character of the cellulose aggregate.

For the manufacture of viscose according to the invention, the carbon disulphide is employed in an amount corresponding only to about that which is to be bound to several cellulose molecules in the final product, viz. in a quantity not exceeding half a molecule (i. e. more than about 38 parts by weight), e. g. about ⅕ or ¼ to ½ a molecule (about 15 or 19 to 38 parts by weight) per molecule of cellulose, $C_6H_{10}O_5$ (that is, per 162 parts of cellulose), and the caustic soda or other alkali is employed in a restricted quantity not exceeding about two molecules (80 parts by weight of caustic soda) per molecule (162 parts by weight) of cellulose $C_6H_{10}O_5$ and is preferably about one molecule (40 parts by weight of caustic soda) or less per molecule (162 parts) of cellulose $C_6H_{10}O_5$, and the alkali cellulose, (which expression likewise includes the cellulose conversion products treated with alkali) is always subjected to the action of the restricted quantity of carbon disulphide in a suitable organic solvent or diluent of the disulphide, such for example as benzol, or other organic liquids which dissolve or mix uniformly with the disulphide. The carrying out of the treatment of the alkali cellulose with the carbon disulphide in such organic diluents or solvents (hereinafter included in the expression organic diluent miscible with carbon disulphide) is important for the production of the high molecular viscose containing several molecules of cellulose bound to one molecule of carbon disulphide, as by this means the quantity of disulphide for forming a xanthogenate containing several molecules of cellulose bound to one molecule of disulphide as mentioned, can be evenly distributed and brought into intimate contact with every part of the alkali-cellulose, thus avoiding local action and securing even and homogenous combination and greater protection against oxidation.

The restricted quantity of alkali used for making the alkali cellulose preparatory to the treatment with the restricted quantity of carbon disulphide is preferably employed in a concentrated solution for example of 20–50% and preferably 50% in order to fix the alkali intimately in the cellulose and enable the presence of free alkali in water to be avoided in the xanthogenation stage.

The alkali-cellulose employed may be prepared with the restricted quantity of alkali in any suitable way, which should involve as little degradation of the cellulose as possible. The caustic alkali is preferably applied in a concentrated form as before mentioned for example in a solution containing 20 to 50 per cent and preferably 50% by weight of NaOH, surplus solution being removed by squeezing, centrifuging or otherwise so as to leave the required amount of alkali in the alkali cellulose.

By employing such concentrated solution, such as 50%, water can be thoroughly eliminated, so that in the xanthogenation the disulphide acts really on the cellulose without the cellulose going into solution and being thus more quickly attacked by detrimental influences, and all the carbon disulphide is used upon the cellulose as it does not find free alkali in water.

The solvent or diluent of the carbon disulphide, in which the reaction is performed may be removed in any suitable way.

The viscose formed may be dissolved in water or alkali solution or other solvents and be worked up for making artificial silk or other products, or be applied to any other uses of which viscose is capable.

*Example.*—An alkali cellulose is prepared by impregnating cellulose or a near conversion product thereof, with a solution of 20 to 50 per cent, (preferably 50%) by weight, of caustic soda, the surplus liquid being squeezed or centrifuged out, so as to leave about one molecule (40 parts by weight) or less of caustic soda in the cellulose per mole of cellulose. The cellulose so prepared may stand for some time before being brought together with the disulphide, but preferably it is directly mixed or kneaded thoroughly with benzol containing about ½ to ¼ of a molecule (38 to 19 parts by weight) of carbon disulphide per molecule (162 parts by weight) of cellulose $(C_6H_{10}O_5)$, the reaction being continued until a test of the xanthogenate formed is shown to be soluble by diluting with water, and all or substantially all of the disulphide has combined with the cellulose as shown by testing the samples for free disulphide. The diluent can then be removed by vacuum or by adding water and running off the supernatant diluent, or in any other suitable way.

The viscose obtained is soluble in water and in alkali. The so obtained solutions can be directly used for spinning without ripening.

It is to be understood that the foregoing example is given by way of illustration. Other quantities and concentrations of alkali and disulphide than those specified in the example may be employed and the procedure may otherwise be varied within the spirit of the invention. The viscose solution is used for spinning in the usual known ways, by using for example mineral acid or bisulphates, etc.

Solutions of viscose made according to the invention can be used for spinning or producing artificial silk, films and the like in the usual known ways, by employing coagulating baths containing mineral acid or bisulphates and so forth with any hitherto known adjuncts or improvements. Especially however, the coagulation may be effected, preferably with moderate heating, in baths not containing mineral acids, but containing acids weaker than sulphuric acid, such as acetic acid or formic acid, or baths containing alkali metal bicarbonate, etc. Or coagulation baths may be employed containing, instead of mineral acid, an organic acid such as acetic or formic acid in presence of a stronger organic acid, such as oxalic acid, etc. or containing such stronger organic acids without the weaker organic acids.

What I claim and desire to secure by Letters Patent is:—

1. Process for the manufacture of viscose having in its constitution a molecule of carbon disulphide combined with several cellulose molecules, said process comprising subjecting a cellulosic body in association with caustic alkali to the action of carbon disulphide in an inert organic diluent miscible with carbon disulphide, the quantity of caustic alkali in association with the cellulosic body being not more than 2 molecules per molecule of cellulose, and the quantity of carbon disulphide not exceeding half a molecule per molecule of cellulose.

2. Process for the manufacture of viscose having in its constitution a molecule of carbon disulphide combined with several cellulose molecules, said process comprising subjecting a cellulosic body in association with caustic alkali to the action of carbon disulphide in an inert organic diluent miscible with carbon disulphide, the quantity of caustic alkali associated with the cellulosic body being not more than one molecule per molecule of cellulose, and the quantity of carbon disulphide not exceeding half a molecule per molecule of cellulose.

3. Process for the manufacture of viscose having in its constitution a molecule of carbon disulphide combined with several cellulose molecules, said process comprising subjecting a cellulosic body in association with caustic alkali to the action of carbon disulphide in an inert organic diluent miscible with carbon disulphide, the quantity of caustic alkali in association with the cellulosic body being not more than 2 molecules per molecule of cellulose, and the quantity of carbon disulphide being between about one-fifth and one-half a molecule per molecule of cellulose.

4. Process for the manufacture of viscose having in its constitution a molecule of carbon disulphide combined with several cellulose molecules, said process comprising subjecting a cellulosic body in association with caustic alkali to the action of carbon disulphide in an inert organic diluent miscible with carbon disulphide, the quantity of caustic alkali associated with cellulosic body being not more than one molecule per molecule of cellulose, and the quantity of carbon disulphide being between about one-fifth and one-half a molecule per molecule of cellulose.

5. Process for the manufacture of viscose having in its constitution a molecule of carbon disulphide combined with several cellulose molecules, said process comprising subjecting a cellulosic body in association with caustic alkali of concentration between about 20 and 50 per cent, to the action of carbon disulphide in an inert organic diluent miscible with carbon disulphide, the quantity of caustic alkali in association with the cellulosic body being not more than 2 molecules per molecule of cellulose, and the quantity of carbon disulphide not exceeding half a molecule per molecule of cellulose.

6. Process for the manufacture of viscose having in its constitution a molecule of carbon disulphide combined with several cellulose molecules, said process comprising subjecting a cellulosic body in association with caustic alkali of concentration between about 20 and 50 per cent, to the action of carbon disulphide in an inert organic diluent miscible with carbon disulphide, the quantity of caustic alkali in association with the cellulosic body being not more than one molecule per molecule of cellulose, and the quantity of carbon disulphide being between about one-fifth and one-half a molecule per molecule of cellulose.

7. Process for the manufacture of viscose having in its constitution a molecule of carbon disulphide combined with several cellulose molecules, said process comprising subjecting a cellulosic body in association with caustic alkali to the action of carbon disulphide in benzol, the quantity of caustic alkali in association with the cellulosic body being not more than 2 molecules per molecule of cellulose, and the quantity of carbon disulphide not exceeding half a molecule per molecule of cellulose.

8. Process for the manufacture of viscose having in its constitution a molecule of carbon disulphide combined with several cellulose molecules, said process comprising subjecting a cellulosic body in association with caustic alkali to the action of carbon disulphide in benzol, the quantity of caustic alkali associated with the cellulosic body being not more than one molecule per molecule of cellulose, and the quantity of carbon disulphide not exceeding half a molecule per molecule of cellulose.

9. Process for the manufacture of viscose having in its constitution a molecule of carbon disulphide combined with several cellulose molecules, said process comprising subjecting a cellulosic body in association with caustic alkali to the action of carbon disulphide in benzol, the quantity of caustic alkali in association with the cellulosic body being not more than 2 molecules per molecule of cellulose and the quantity of carbon disulphide being between about one-fifth and one-half a molecule per molecule of cellulose.

10. Process for the manufacture of viscose having in its constitution a molecule of carbon disulphide combined with several cellulose molecules, said process comprising subjecting a cellulosic body in association with caustic alkali to the action of carbon disulphide in benzol, the quantity of caustic alkali associated with the cellulosic body being not more than one molecule per molecule of cellulose, and the quantity of carbon disulphide being between about one-fifth and one-half a molecule per molecule of cellulose.

In testimony whereof I have hereunto subscribed my name.

HENRY DREYFUS.